United States Patent [19]

Vogel

[11] 4,285,348

[45] Aug. 25, 1981

[54] THRESHING MACHINE

[75] Inventor: Orville A. Vogel, Pullman, Wash.

[73] Assignee: Hartman L. Gearhiser, Pullman, Wash.

[21] Appl. No.: 130,554

[22] Filed: Mar. 14, 1980

[51] Int. Cl.³ .............................................. A24C 1/32
[52] U.S. Cl. .................................... 130/30 H; 130/28
[58] Field of Search .................... 130/30 H, 30 B, 28, 130/30 R; 99/600, 602, 603, 609, 610, 617

[56] References Cited

U.S. PATENT DOCUMENTS

| | | | |
|---|---|---|---|
| 1,821,767 | 9/1931 | Poole | 99/609 |
| 2,321,461 | 6/1943 | Christel | 130/30 H |
| 2,706,373 | 4/1955 | Nisbet | 130/30 R |
| 2,790,444 | 4/1957 | Rossman | 130/30 R |
| 3,141,485 | 7/1964 | Bonner et al. | 130/30 R |

FOREIGN PATENT DOCUMENTS 1157649  6/1958  France ........................... 99/617

Primary Examiner—Robert A. Hafer
Attorney, Agent, or Firm—Wells, St. John & Roberts

[57] ABSTRACT

A small scale threshing machine using a rotary flail wheel for threshing small lots of various seed crops. The machine includes a cylindrical hollow housing enclosing a flail wheel that rotates about a horizontal axis. A chute leads to an opening in the upright face of the housing to one side of the horizontal axis. The flail wheel includes two pair of opposed flail arms. Each arm extends substantially radially outward from the rotary axis and presents a threshing surface thereon for striking and separating seed from sheaves inserted through the chute. Shelling bars are situated adjacent the rotating flail wheels to provide obstruction to the seed or grain thereby permitting a rubbing action to thresh out seed not completely threshed by the flail arms. A baffle situated above the chute opening aids in producing an inward airflow toward the flail arms and downward toward the bottom of the housing.

9 Claims, 5 Drawing Figures

THRESHING MACHINE

BACKGROUND OF THE INVENTION

The present invention relates to small scale threshing machines and related apparatus for threshing small lots of seed crops such as those grown at experimental stations and in plots less than an acre in size.

Presently known machinery for small scale threshing makes use of "spike" or "bar" threshing cylinders. Though usually effective, such machinery is complex and is often too expensive to justify expenditure for small "back lot" farmers or experimental growers.

U.S. Pat. No. 2,662,570 to E. F. Hansen discloses a hulling machine that makes use of rotating discs rather than drums for the purpose of hulling castor beans and other nut type seeds. The seeds are fed through the hopper axially between a pair of rubberized discs that rotate relative to one another. The seeds are pinched between the discs and rubbed against the disc surfaces until the hull breaks and falls with the seed meat to a hopper below. This machine is probably serviceable for large, thick hulled seeds such as nuts and beans but could not operate effectively on thin hull seeds such as wheat.

U.S. Pat. No. 1,284,852 to Larisey discloses a peanut shelling machine having a shelling disc rotating about a horizontal axis in a circular housing. Peanuts are fed down radially onto the disc which has blades for shearing the nuts against the housing. An updraft of air is provided by a separate blower to separate the shells from the nuts. The nuts fall to a hopper below the housing. This machine with its shearing action for shelling peanuts would not operate effectively on smaller seed crops such as wheat, barley, oats, etc., which grow on stalks and must be jarred loose before the thin hulls can be effectively removed from the seed. The hulls must be removed by impact and rubbing action that would not be provided by feeding radially into a rotating disc as shown by Larisey.

The problem thus remains of providing a simple yet effective small scale threshing machine for seed crops within the market range of the small lot growers.

DETAILED DESCRIPTION OF A PREFERRED EMBODIMENT

Figure 1:
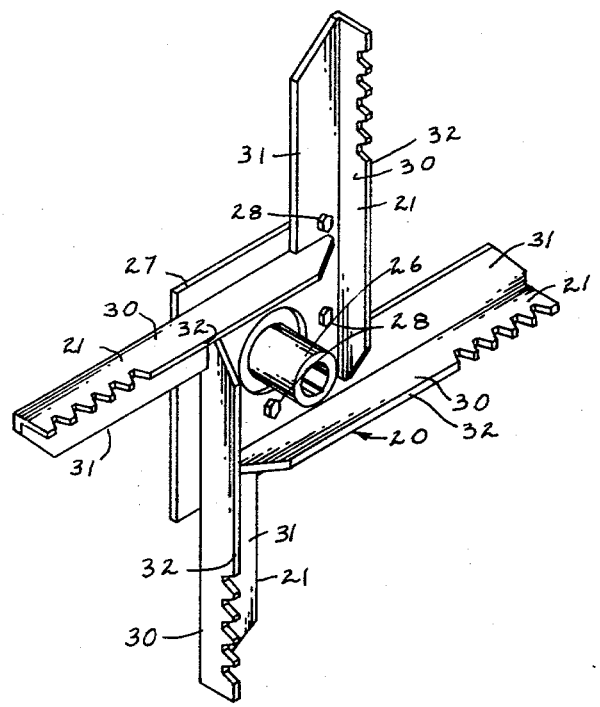
FIG. 1 is a pictorial view of the present flail wheel.
Figure 2:
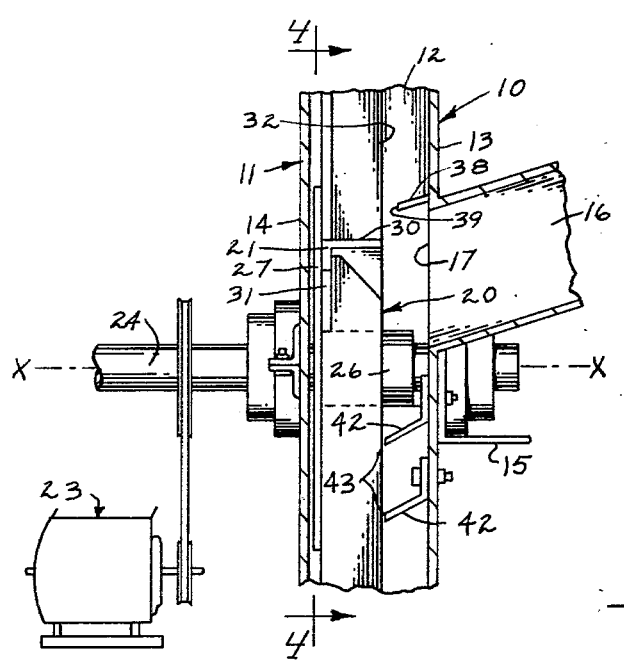
FIG. 2 is a fragmentary diagrammatic section taken through the threshing machine.

The present threshing machine is shown generally in the drawings by the reference character 10. The present machine 10 is preferably constructed on a relatively small scale for use by small lot growers of seed crops such as wheat, and other seeds and grain that can be harvested in sheaves.

The present machine 10 includes an upright hollow housing 11. The housing 11 is substantially cylindrical, having a circular peripheral wall 12 joined at opposite ends by a front side wall 13 and a back side wall 14. The peripheral wall 12 is centered on a horizontal axis X—X. The housing is supported above the ground surface with the axis in a horizontal orientation through provision of a rigid frame 15.

A chute 16 leads angularly toward the front housing side 13. The chute 16 opens at 17 into the housing interior. Chute opening 17 is situated to one side of the horizontal axis X—X and is preferably horizontally disposed from the axis or spaced slightly above the axis elevation.

A flail wheel 20 is rotatably mounted within the housing 11 on the axis X—X. The flail wheel has substantially radial flail arms 21 that extend from the axis to overlap the opening 17 when rotating about the axis X—X. In other words, the distance from the axis to the ends of the flail arms 21 is greater than the distance from the axis to the opening 17. The flail arms will therefore successively traverse the opening as the flail wheel is rotated. The flail arms thus move in a defined circular path with its center on the axis X—X and with its circumference enclosing the opening 17.

Rotation of the flail wheel 20 is caused by drive means 23. The drive means is operated to rotate the flail wheel so the flail arms 21 will move downwardly across the opening 17. The drive means 23 may be comprised of a standard electric or gasoline motor connected to a rotary shaft 24 journalled on the housing 11 about the axis X—X. Appropriate power transmission means such as belts and pulley can be provided to interconnect the motor or engine with the rotary shaft 24. The motor or engine and its associated power transmission mechanisms can be mounted either to the housing 11 or the supportive framework 15.

Figure 3:
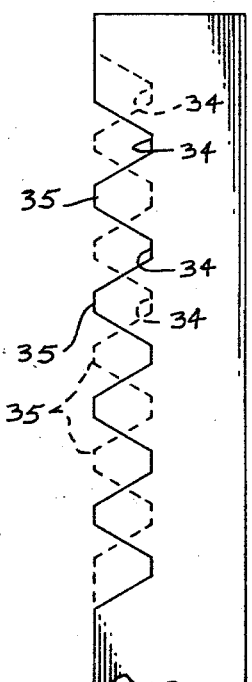
FIG. 3 is an enlarged diagrammatic view illustrating an overlapping notch arrangement of the adjacent flail arms.
Figure 4:
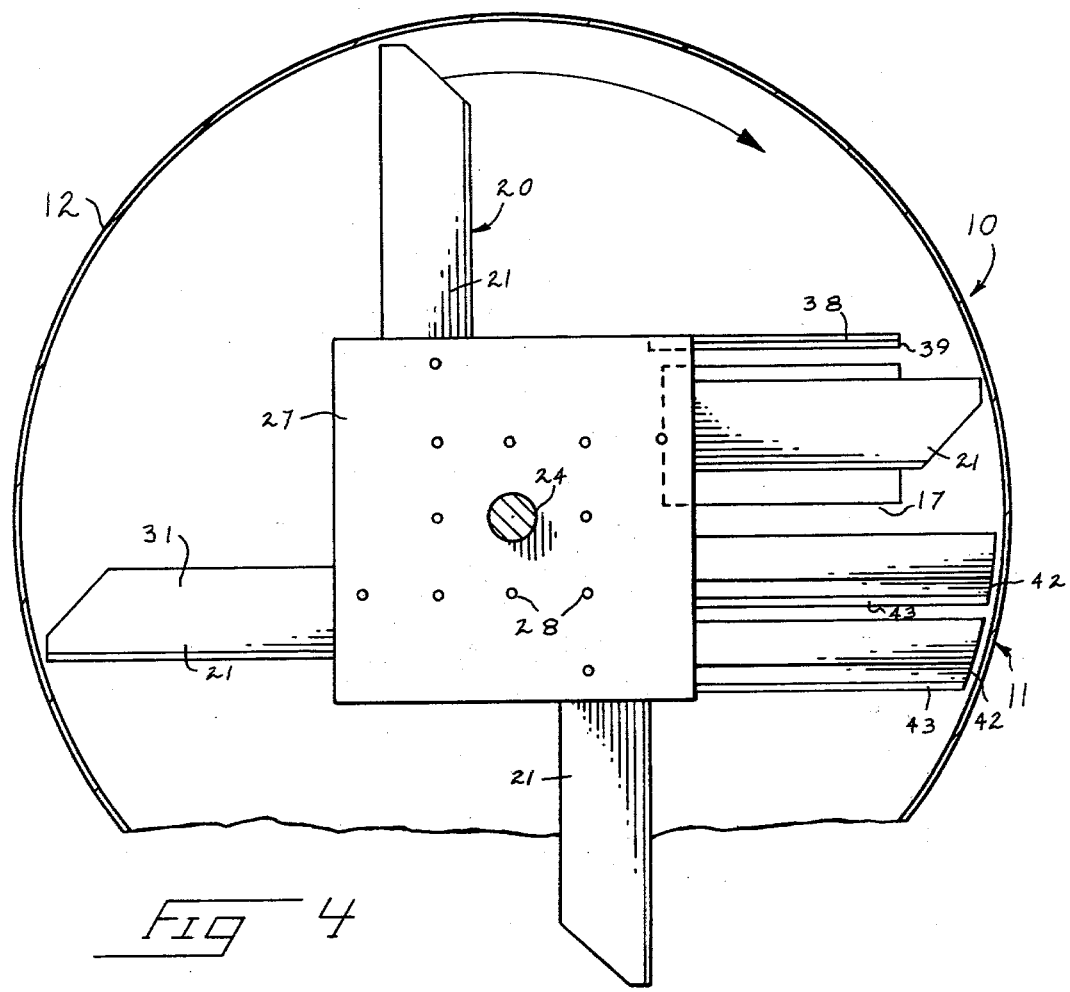
FIG. 4 is an enlarged fragmented sectional view taken along line 4—4 in FIG. 2.
Figure 5:
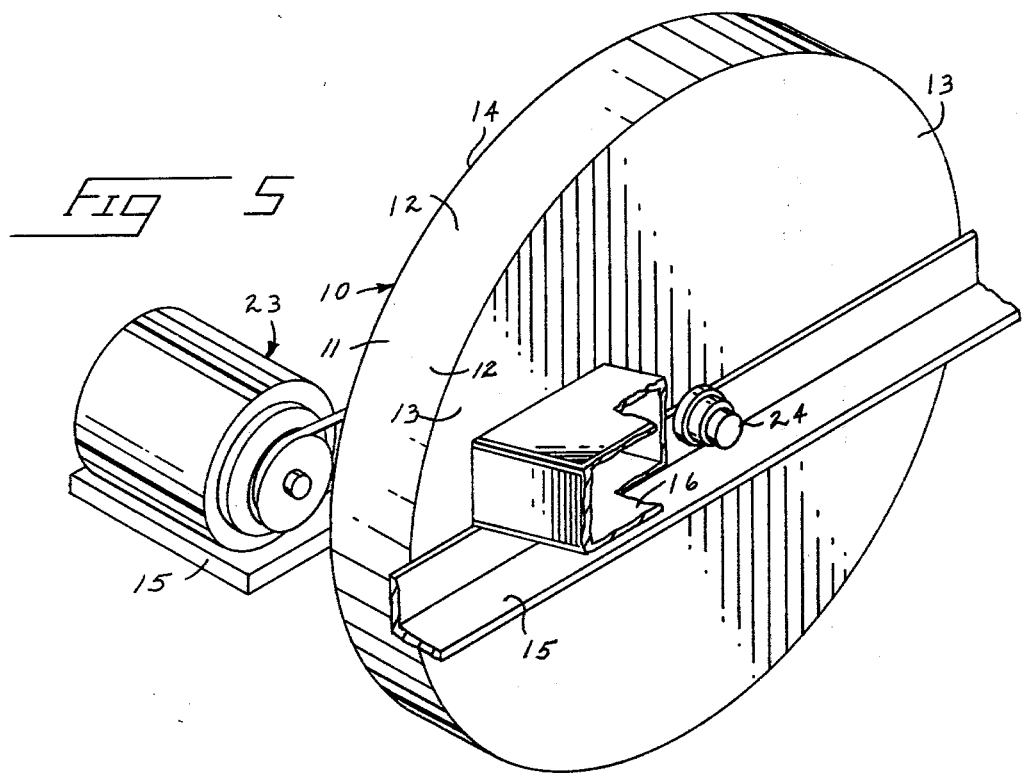
FIG. 5 is a pictorial view of the present threshing machine housing and chute arrangement.

The flail wheel 20 is shown in substantial detail by FIGS. 1 and 3. Wheel 20 includes a central hub 26 that is adapted to fit over the rotary shaft 24. Appropriate locking mechanisms such as keyways or set screws may be provided (not shown) to releasably secure the hub 26 to the rotary shaft 24 for rotation therewith.

A backing plate 27 is affixed to hub 26. The backing plate 27 presents a flat surface that is perpendicular to the hub axis (axis X—X) to present a mounting surface for the flail arms 21. The several flail arms are mounted by appropriate bolts 28 (FIG. 1) to the backing plate 27 enabling the arms 21 to be easily removed from the hub and backing plate for replacement after extended wear.

The flail arms 21 are mounted in diametrically opposed pairs of the backing plate 27. Each flail arm 21 is formed of an elongated bar of "L" shaped cross section. The individual arms 21 are each mounted to the backing plate 27 so one leg 30 of the "L" shape is parallel with the axis X—X while the remaining leg 31 is perpendicular. Legs 31 receive bolts 28 for mounting the arms to backing plates 27. Legs 30 lead forwardly from the backing plate (when mounted within the housing) toward the front housing side 13. They terminate at longitudinal edges 32 that lie within a vertical plane.

The edges 32 of the flail arm present flail surfaces utilized to strike seed from the stocks and to comb through the sheaves fed into the housing through the chute 16. The flail surfaces are preferably comprised of a row of notches formed in the several flail arms. The surfaces are equally spaced from axis X—X to overlap the opening 17 as they rotate in the circular path. Each notch includes a trough 34 joined to adjacent notches by points 35.

The rows of notches for the flail arm pairs are arranged as shown in FIG. 1 and especially FIG. 3 so that the notches of one flail arm will be staggered in relation to the notches of a following arm. This feature is shown clearly in FIG. 3 wherein one flail arm is shown in solid lines and the flail arm following in the circular path of rotation is shown by dashed lines. The points 35 of one arm coincide with the troughs 34 of the next trailing flail arm. With this arrangement, one flail arm will "comb" through sheave material introduced through the chute 16 striking and removing seed from the plant stocks. The next successive flail arm in the circular path will not comb through the same area and will therefore engage and knock seeds from the stocks that were not removed by the first flail arm.

Within the housing 11, on the front side 13, is a substantially horizontal baffle bar 38. The baffle bar 38 projects from the front side 13 into the housing toward the flail wheel 20. An inward edge 39 of the bar 38 is situated closely adjacent to the plane of the flail arm edges 32. As successive arms move downwardly past the baffle bar 38, a sudden reduction in air pressure is produced. This causes air to be drawn into the flail wheel housing through the feed chute. The air current produced leads into the housing to carry with it any chaff and dirt which otherwise would be blown out of the chute in the direction of the operator. In addition, the inwardly directed airstream carries any chaff and straw particles into the housing that would be otherwise built up on the bottom of the feed chute.

The air current produced by the rotating flail wheel and baffle bar 38 is not sufficient to endanger the operator by causing a strong suction. The air flow produced is sufficient only to urge loose, lightweight particles such as chaff and dirt inwardly in the direction of the flail arms to improve the threshing action and to protect the operator from possible "kickback" of material striking the flail arms.

One and preferably two shelling bars 43 are also situated within the housing 11 along the front side 13. The shelling bars are bolted to the side 13 below the feed chute opening 17. They are preferably bent downwardly at a 45° angle. The purpose of the shelling bars is to provide an extra obstruction for seed knocked from sheaves at the chute opening and therefore permits additional rubbing action to thresh out pieces of grain heads or seed not completely threshed by the first strike of the flail arms. The shelling bars 42 include substantially horizontal inward edges 43 that are situated closely adjacent the edges 32 of the flail arms. The shelling bars thus deflect material first struck by the downwardly moving flail arms back into the circular path of the flail arms to be struck again before leaving the flail wheel and dropping into the lower portions of the housing.

It is understood that various known separating devices may be provided in conjunction with or adjacent to the housing for separating the chaff from the threshed seeds. Such apparatus is therefore not illustrated in the drawings nor will there be further description of such apparatus. It will suffice to say that any of several standard, conventional forms of separating apparatus can be associated with the apparatus of the present invention for collecting the threshed seed and chaff separately.

During operation, individual sheaves of material are fed through the chute 16 so the grain or seed heads project through the opening 17 into the circular path of the rotating flail arms 21. The rotating flail arms comb through the stock heads and remove the seed along with chaff from the stocks.

The machine does not pull sheaf materials into the machine and thereby greatly reduces the danger of an operator's hand being drawn into the rotating flail arms. The sheaf material need merely to be shoved gently into the flail wheel housing and when the heads are threshed off, pulled out and discarded with the materials dropped into the bottom of the feed chute being drawn into the housing by the inwardly flowing airstream as described above.

The dismembered seeds are first struck by the rotating flail arms along the flail surfaces thereof which overlap the chute opening 17. Part of the hulls may be removed from much of the grain or seed at this instant. The remaining, unhulled seed, however, will eventually become hulled as it is deflected onto one or both of the shelling bars 42 where it is rubbed over the surfaces or deflected back into the path of the flail arms 22. The threshed seed then falls to the bottom of the hopper along with the chaff where both are processed further by conventional separating mechanisms.

The present threshing machine, especially the flail wheel, when compared with conventional "cylinder-concave" threshing devices is substantially simpler in design and is less costly to construct. Yet, the machine performs very effectively to thresh small amounts of seed crop material without endangering the operator.

The above description and drawings have been presented to set forth a preferred form of the present invention. The scope of my invention, however, is more precisely set forth by the following claims.

What I claim is:

1. A threshing machine, comprising:
    a frame;
    a hollow circular housing mounted to the frame and formed on a horizontal axis having an upright front side and an axially spaced back side;
    a feed chute leading axially to an opening formed through the front side of the housing to one side of the horizontal housing axis;
    a shaft mounted to the housing for rotation about the horizontal axis;
    a flail wheel mounted to the shaft within the housing for rotation in a circular path therein about the horizontal axis and having a flail arm extending radially outwardly from the housing axis by a distance greater than the distance from the axis to the chute opening;
    said flail arm having a radially extending threshing surface thereon;
    means for rotating the flail wheel on the shaft about the horizontal axis in a direction so the flail arm will move downwardly in an arcuate path past the chute opening; and
    baffle means within the housing immediately above the feed chute opening and adjacent the path of the flail arm for producing an inward motion of air entering the housing through the chute opening as the flail arm moves in the arcuate path past the chute opening.

2. The threshing machine as defined by claim 1 wherein the threshing wheel is comprised of:
    a plurality of flail arms radially extending from the horizontal axis, in diametrically opposed relation;
    wherein said threshing surface is provided on each flail arm and is comprised of a row of notches formed along the length of each arm facing the front side of the housing and sequentially passing in the arcuate path past the baffle to produce the inward motion of air.

3. The threshing machine as defined by claim 2 wherein the notches of one flail arm are staggered in relation to the notches of another arm following in the arcuate path of the flail arms past the chute opening.

4. The threshing machine as defined by claim 1 further comprising a shelling bar mounted within the housing along the front side thereof directly below the chute opening adjacent the arcuate path of the flail arm to direct the material being threshed into the path of the flail arms.

5. The threshing machine as defined by claim 4 wherein the shelling bar projects inward toward the arcuate path defined by the flail arm as it moves past the chute opening and is radially positioned in relation to the axis to overlap the length of the flail surface.

6. The threshing machine as defined by claim 4 wherein the shelling bar projects inward toward the flail wheel and angularly downward from the front housing side to direct the material being threshed into the path of the flail arms.

7. The threshing machine as defined by claim 4 wherein the threshing wheel is comprised of:

a plurality of flail arms extending from the horizontal axis in diametrically opposed relation;

wherein said flail surface is provided on each flail arm and is comprised of a row of notches formed along the length of each arm facing the front side of the housing.

8. The threshing machine as defined by claim 7 wherein the notches of one flail arm are staggered in relation to the notches of another arm following in the rotational path of the flail arms about the horizontal axis.

9. A flail wheel for a rotary shaft threshing machine, comprising:

a hub member adapted to be mounted to the rotary shaft of the threshing machine and having a central hub axis;

at least two of opposed flail arms mounted to the hub member and extending outwardly from the central hub axis;

flail surfaces on the flail arms facing one axial direction and arranged within a circular path defined by the flail arms when rotated about the hub axis;

wherein the flail surface on one of the flail arms is comprised of a row of notches formed within the one arm and wherein the flail surface on the flail arm following the one flail arm in said circular path includes notches that are staggered in relation to the notches in the one flail arm.

* * * * *